(12) United States Patent
Courtel (10) Patent No.: US 10,578,463 B2
(45) Date of Patent: Mar. 3, 2020

(54) DETECTION OF DEFECTS IN MOTOR POSITION DECODER SYSTEM

(71) Applicant: Microchip Technology Incorporated, Chandler, AZ (US)

(72) Inventor: Karl Courtel, Reze (FR)

(73) Assignee: MICROCHIP TECHNOLOGY INCORPORATED, Chandler, AZ (US)

(*) Notice: Subject to any disclaimer, the term of this patent is extended or adjusted under 35 U.S.C. 154(b) by 298 days.

(21) Appl. No.: 15/384,024

(22) Filed: Dec. 19, 2016

(65) Prior Publication Data
US 2018/0172480 A1   Jun. 21, 2018

(51) Int. Cl.
G01D 5/244 (2006.01)
G01D 5/24 (2006.01)
G01D 5/245 (2006.01)

(52) U.S. Cl.
CPC ....... G01D 5/24457 (2013.01); G01D 5/2451 (2013.01); G01D 5/24461 (2013.01)

(58) Field of Classification Search
CPC ........... G01D 5/24457; G01D 5/24461; G01D 5/2451
See application file for complete search history.

(56) References Cited

U.S. PATENT DOCUMENTS

| | | | | |
|---|---|---|---|---|
| 4,266,170 A | * | 5/1981 | Inoue | G05B 19/40 318/565 |
| 4,622,499 A | * | 11/1986 | Squires | H02P 6/17 318/269 |
| 4,736,187 A | * | 4/1988 | Kibrick | G01D 5/2457 250/231.14 |
| 4,914,437 A | * | 4/1990 | Kibrick | G01D 5/2457 250/231.18 |
| 5,530,331 A | * | 6/1996 | Hanei | G01D 5/2455 318/592 |
| 5,905,350 A | * | 5/1999 | Hofbauer | G01D 5/24409 318/400.28 |

(Continued)

FOREIGN PATENT DOCUMENTS

EP   1398244 A2   3/2004   ............. B62D 15/02

OTHER PUBLICATIONS

International Search Report and Written Opinion, Application No. PCT/US2017/067288, 10 pages, dated Apr. 6, 2018.

*Primary Examiner* — Lisa E Peters
(74) *Attorney, Agent, or Firm* — Slayden Grubert Beard PLLC (57) ABSTRACT

Systems and methods for processing sensor information obtained from a coding wheel of a motor may detect defects in the sensor information caused by contamination or damage of any of the angular step markers, index marker, and/or blank space on the tracks of the coding wheel. A step counter counts toward an overflow value representing the number of angular step markers on the coding wheel. The step counter and the index are correlated: when the overflow value is reached, if the index marker is not detected an error is raised; coincidently, when the index marker is detected, if the step counter has not reached the overflow value an error is raised. The systems and methods may be applied to bidirectionally rotating motors and other devices by detecting a change in rotational direction and switching from incrementing the angular step counter to decrementing it, and vice versa.

22 Claims, 7 Drawing Sheets

(56) References Cited

U.S. PATENT DOCUMENTS

| | | | | |
|---|---|---|---|---|
| 6,043,483 | A * | 3/2000 | Schreiber | G01D 5/36 250/231.13 |
| 6,091,219 | A * | 7/2000 | Maruo | G05B 19/31 318/562 |
| 6,380,927 | B1 * | 4/2002 | Ostrum | G06F 3/0312 345/165 |
| 6,970,108 | B1 * | 11/2005 | Cullen | H03M 1/303 341/11 |
| 8,823,576 | B2 * | 9/2014 | Taniguchi | G01D 5/24457 340/870.01 |
| 10,119,842 | B1 * | 11/2018 | Grossman | G01D 5/264 |
| 2003/0160160 | A1 * | 8/2003 | Taniguchi | H03M 1/1038 250/231.13 |
| 2005/0166413 | A1 * | 8/2005 | Crampton | B25J 13/088 33/503 |
| 2005/0275568 | A1 * | 12/2005 | Madni | G01D 5/2053 341/50 |
| 2006/0250104 | A1 * | 11/2006 | Reichert | G02B 26/122 318/651 |
| 2009/0229134 | A1 * | 9/2009 | Nagase | G01D 5/24457 33/1 PT |
| 2011/0282612 | A1 * | 11/2011 | Cramer | G01D 5/24452 702/94 |
| 2013/0134919 | A1 * | 5/2013 | Takayama | G05B 19/416 318/625 |
| 2013/0240719 | A1 * | 9/2013 | Sato | G01D 5/34 250/231.14 |
| 2013/0265639 | A1 * | 10/2013 | Batchvarov | G02B 23/165 359/430 |
| 2015/0224845 | A1 * | 8/2015 | Anderson | B60G 17/019 701/37 |
| 2016/0131508 | A1 | 5/2016 | Nagata et al. | 250/231.14 |
| 2016/0146638 | A1 * | 5/2016 | Dixon | G01D 5/142 324/207.12 |
| 2016/0344429 | A1 * | 11/2016 | Ogawa | G01D 5/24461 |

* cited by examiner

DETECTION OF DEFECTS IN MOTOR POSITION DECODER SYSTEM

BACKGROUND

The present disclosure relates to motor position detection systems, and particularly to systems for detecting and reporting potential defects in a coding wheel used to determine the position of a motor.

Coding wheels are used in motor regulation to detect speed and also rotational, or angular, position of the motor. A coding wheel for position detection includes one or more index markers and/or one or more sets of uniformly sized and spaced angular step markers. The coding wheel spins while the motor is operating. A photo-detector projects a beam onto the coding wheel and detects the markers as they pass through the beam. A decoding computer then interprets the detection information to determine the motor position; detection of the index marker may indicate a complete revolution of the motor, while each angular step marker corresponds to a degree increment of the angular position.

A lack of accuracy in the detected angular motor position can lead to a loss of motor performance and can even cause damage to the motor. Coding wheel defects can, for example, come from dust or dirt on the coding wheel that prevents reflection of the beam back to the photo-detector or creates a parasitic reflected beam (i.e., from glossy or reflective dust) detected by the photo-detector, or from damage to the coding wheel that impacts the reflection of the beam back to the photo-detector. These defects induce an inaccurate change of step count between index detections, which in turn causes the decoding computer to record the wrong motor position and speed during rotation. It is useful to be able to detect various cases of coding wheel and/or other detection defects, and to generate alerts for maintenance of the detection system, such as cleaning or repairing the coding wheel, is needed.

SUMMARY

The present disclosure provides methods, apparatus, and/or systems for detecting defects in position or speed sensing systems for a rotating device, such as on a coding wheel to avoid loss of motor performance and damage caused by inaccurate motor position tracking. In some embodiments, a method of detecting errors in a motor position sensing system may include detecting edges of at least a first angular step signal and an index signal, the first angular step signal indicative of an angular position of a motor shaft, the index signal indicative of a complete revolution around the motor shaft of an index of a coding wheel, and the index signal having a first value if the index is detected and a second value if the index is not detected, and, responsive to a detection of one of the edges: receiving a step count representing a number, between an initial value and an overflow value, of detected edges of at least the first angular step signal; producing an overflow signal having the first value if the step count is equal to the overflow value and having the second value if the step count is not equal to the overflow value; determining whether the overflow signal and the index signal match; and, responsive to a determination that the overflow signal and the index signal do not match, generating an error signal indicating that one of the errors is detected.

The method may further include detecting edges of a second angular step signal indicative of the angular position, the first angular step signal and the second angular step signal being aligned in quadrature and being further indicative of a direction of rotation of the motor shaft, the step count representing the number of detected edges of both the first angular step signal and the second angular step signal. When the motor shaft is rotating in a first direction, the initial value may be zero and the overflow value may be a preset maximum value associated with a number of angular step markers on the coding wheel, and when the motor shaft is rotating in a second direction opposite the first direction, the initial value may be the preset maximum value and the overflow value may be zero. Receiving the step count may include the steps of: if a previous step count of previously detected edges is equal to the overflow value, setting the step count equal to the initial value; and, if the previous step count is not equal to the overflow value, incrementing the previous step count to produce the step count if the motor shaft is rotating in the first direction, and/or decrementing the previous step count to produce the step count if the motor shaft is rotating in the second direction.

Generating the error signal may include, if the overflow signal has the first value, generating the error signal as a first error signal indicating an expected detection of the index is missing, and/or, if the index signal has the first value, generating the error signal as a second error signal indicating the index was detected before all angular step markers of the coding wheel were detected; the method may further include, responsive to a determination that one or both of the overflow signal and the index signal has the first value, generating a reset signal that resets the step count to the initial value upon a successive detection of one of the edges of the first angular step signal. The edges may be detected for a runtime of the motor, the runtime beginning at the motor startup and including the detection of the one of the edges, and the method may further include, responsive to generating the error signal as the second error signal: determining whether the second error signal was previously generated during the runtime; responsive to a determination that the second error signal was not previously generated during the runtime, ignoring the generated second error signal; and, responsive to a determination that the second error signal was previously generated during the runtime, sending the generated second error signal to a microprocessor configured to control the motor.

In another embodiment, the present disclosure provides a system for detecting errors in sensor signals recorded from a rotating device. The system may include: an edge detection circuit operable for detecting edges of at least a first angular step signal and an index signal, the first angular step signal indicative of an angular position of the device, the index signal indicative of a complete revolution of an index around the device, and the index signal having a first value if the index is detected and a second value if the index is not detected; a counter circuit coupled to the edge detection circuit, the counter circuit operable for maintaining a step count representing a number of detections of one of the edges of at least the first angular step signal; and an error detection circuit coupled to the edge detection circuit and to the counter circuit, the error detection circuit operable for detecting the errors. The error detection circuit may detect the errors by, responsive to any of the number of detections of one of the edges: receiving the step count; producing an overflow signal having the first value if the step count is equal to a preset overflow value and having the second value if the step count is not equal to the overflow value; determining whether the overflow signal and the index signal match; and, responsive to a determination that the overflow signal and the index signal do not match, generating a first error signal indicating that one of the errors is detected.

The counter circuit may further be operable for maintaining a revolution count representing a number of revolutions of the device, and the system may further include a first register electrically connected to the counter circuit and storing a reference value, wherein: at a startup of the device, when the device begins rotating from a stopped position, the counter circuit sets the step count to a first initial value, sets the revolution count to a second initial value, and stores a third initial value in the first register as the reference value; responsive to the edge detection circuit detecting the first of the edges of the index signal occurring after the startup, the counter circuit stores an initialized value in the first register as the reference value; and, responsive to the edge detection circuit detecting each one of the edges of the first angular step signal, the counter circuit updates the step count to a new step count value, if the new step count value is equal to the overflow value, updates the revolution count to a new revolution count value, if the reference value in the first register is not equal to the third initial value, to the initialized value, or to the new revolution count value, generates a second error signal indicating that one of the errors is detected, and, if the reference value in the first register is equal to the third initial value, stores the new revolution count value as the reference value. The error detection circuit may be further operable to: determine whether the first error signal is associated with a first of the errors to be detected subsequent to a startup of the device, when the device begins rotating from a stopped position; responsive to a determination that the first error signal is associated with the first error, ignore the first error signal; and, responsive to a determination that the first error signal is not associated with the first error, send an alert to a component of a device control system.

The device may be a motor, and the motor may include a coding wheel disposed coaxially with a motor shaft of the motor, the coding wheel including the index and a plurality of uniformly spaced angular step markers; the sensor signals are generated by monitoring the coding wheel, and the overflow value may be based on the plurality of angular step markers. The device may alternatively be a rotating button.

The edge detection circuit may be further operable for detecting edges of a second angular step signal that, together with the first angular step signal, is indicative of a direction of rotation of the device; when the device is rotating in a first direction, the overflow value may be a maximum value, and when the device is rotating in a second direction opposite the first direction, the overflow value may be zero. To maintain the step count, the counter circuit may be operable to determine a reset condition and to: determine whether the device is rotating in the first direction or the second direction; responsive to a determination that the device is rotating in the first direction, increment the step count in response to a detection of one of the edges of the first or second angular step signals, and set the step count to zero in response to the reset condition; and, responsive to a determination that the device is rotating in the second direction, decrement the step count in response to a detection of one of the edges of the first or second angular step signals, and set the step count to the maximum value in response to the reset condition. The maximum value may be equal to the number of edges of the first and second angular step signals detectable by the edge detection circuit in one complete revolution of the device when the sensor signals are recorded without errors.

In another embodiment, the present disclosure provides a system for detecting errors in sensor signals used for motor control. The system may include: an edge detection circuit operable for detecting edges of a first quadrature signal, a second quadrature signal, and an index signal, the first and second quadrature signals indicative of an angular position and a direction of rotation of the motor shaft, and the index signal indicative of an index of a coding wheel being detected; a counter circuit coupled to the edge detection circuit, the counter circuit operable for generating a step count by, responsive to a detection of one of the edges of the first and second quadrature signals, moving the step count one step toward an overflow value if the step count is not equal to the overflow value, or resetting the step count to an initial value if the step count is equal to the overflow value, wherein when the motor shaft is rotating in a first direction the initial value is set to zero and the overflow value is set to a preset maximum value, and when the motor shaft is rotating in a second direction opposite the first direction the initial value is set to the preset maximum value and the overflow value is set to zero; and an error detection circuit coupled to the edge detection circuit and to the counter circuit. The error detection circuit is operable for detecting the errors by: when the step count is updated to equal the overflow value, determining whether the index signal indicates an index is detected; responsive to a determination that the index is not detected, generating a first error signal; and, responsive to a detection of a leading edge of the index signal, generating a second error signal if the step count is not equal to the overflow value.

These and other aspects of the invention will become apparent from the following description. In the description, reference is made to the accompanying drawings which form a part hereof, and in which there is shown embodiments of the invention. Such embodiments do not necessarily represent the full scope of the invention and reference is made therefore, to the claims herein for interpreting the scope of the invention.

BRIEF DESCRIPTION OF THE DRAWINGS

The present disclosure will hereafter be described with reference to the accompanying drawings, wherein like reference numerals denote like elements.

DETAILED DESCRIPTION OF PREFERRED EMBODIMENTS

Before the present invention is described in further detail, it is to be understood that the invention is not limited to the particular aspects described. It is also to be understood that the terminology used herein is for the purpose of describing particular aspects only, and is not intended to be limiting. The scope of the present invention will be limited only by the claims. As used herein, the singular forms "a", "an", and "the" include plural aspects unless the context clearly dictates otherwise.

It should be apparent to those skilled in the art that many additional modifications beside those already described are possible without departing from the inventive concepts. In interpreting this disclosure, all terms should be interpreted in the broadest possible manner consistent with the context. Variations of the term "comprising", "including", or "having" should be interpreted as referring to elements, components, or steps in a non-exclusive manner, so the referenced elements, components, or steps may be combined with other elements, components, or steps that are not expressly referenced. Aspects referenced as "comprising", "including", or "having" certain elements are also contemplated as "consisting essentially of" and "consisting of" those elements, unless the context clearly dictates otherwise. It should be appreciated that aspects of the disclosure that are described with respect to a system or apparatus are applicable to the methods, and vice versa, unless the context explicitly dictates otherwise.

Numeric ranges disclosed herein are inclusive of their endpoints. For example, a numeric range of between 1 and 10 includes the values 1 and 10. When a series of numeric ranges are disclosed for a given value, the present disclosure expressly contemplates ranges including all combinations of the upper and lower bounds of those ranges. For example, a numeric range of between 1 and 10 or between 2 and 9 is intended to include the numeric ranges of between 1 and 9 and between 2 and 10.

The present disclosure is presented with particular details relevant to the detection of coding wheel defects in a motor position detection system, but these details may also apply to other motor regulation systems and for monitoring other parameters of a motor, such as motor speed. In particular, the details of the embodiments described below may be adapted for use in any position detector that operates on sensor data pertaining to step-counts of device revolutions and/or degrees of angular rotation. The descriptions herein therefore are not limited in application to detecting position sensing errors, related to a defect or contamination of a coding wheel, to determine a faulty recorded motor position.

Figure 1:
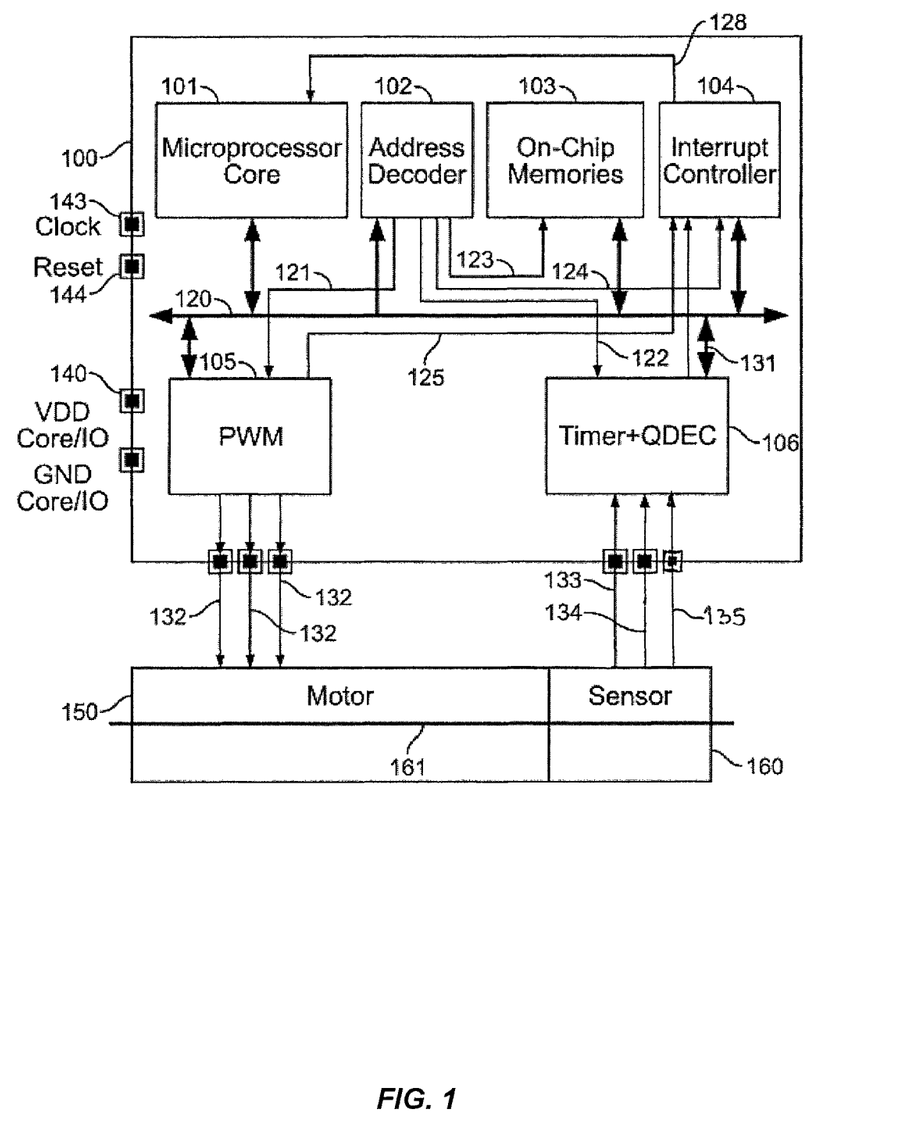
FIG. 1 is a block diagram of an example microcontroller with a quadrature decoder (QDEC) configured to detect defects in a coding wheel in accordance with the present disclosure.

FIG. 1 is a block diagram of an example microcontroller 100 for controlling a motor 150. The microcontroller 100 includes a quadrature decoder ("QDEC") module 106 and a pulse width modulator (PWM) module 105 in signal communication with a microprocessor 101 located in the microcontroller 100. In this example configuration the QDEC 106 is included in a microcontroller. The QDEC 106, however, can be used in any type of integrated circuit (IC) device or can be packaged as its own IC.

To control a motor (e.g., speed, position), a control application generates signals to create the rotation of the motor and receives and processes signals generated by a rotary sensor module mounted on the shaft of the motor. This rotary sensor produces electrical signals that are processed by the control application to determine the rotation, speed, and/or direction of the motor. The microcontroller 100 may execute program instructions to implement the control application, and may include or connect to feedback circuitry for applying control signals and receiving sensor signals. This feedback circuitry allows operation of the motor in a closed loop system for accurate speed and positioning of the motor. The microcontroller 100 can include a peripheral module (e.g., a PWM module 105) to generate the signals used to operate rotation of the motor. The signals from the microcontroller 100 can be amplified (e.g., voltage, current) by means of power transistors (e.g., MOSFET power transistors) or any other power transistors, prior to driving the coils of the motors. The signals generating the rotation are well known in the art and will not be discussed further in this document.

The feedback signals from the rotary sensor are usually not directly processed by the primary microprocessor 101 of the microcontroller 100 but rather are processed by a peripheral module (e.g., a QDEC module 106), which performs filtering and analysis. This method is generally the only way to process these signals in a real time manner without requiring too much CPU bandwidth or power (e.g., very high clock frequency) for the microprocessor 101. Increasing power by adding additional circuitry would make the bill of materials of the control application too expensive for volume production.

Referring to FIG. 1, the microcontroller 100 comprises a microprocessor 101 capable of accessing peripheral circuitries like PWM module 105 and "TIMER+QDEC" Quadrature Decoder 106. Data exchanges are performed by means of a system bus 120, which comprises a read data bus carrying data from peripherals to microprocessor 101, a write data bus carrying data from microprocessor 101 to peripherals, an address bus and control signals to indicate transfer direction on system bus 120. Since the address bus of the system bus 120 is shared by all peripherals there is a need to decode the value carried on this bus to select one peripheral at a time. A circuitry acts as an address decoder 102 by receiving the address bus (part of system bus 120) and providing select signals 121, 122, 123, 124. Peripheral circuits 103, 104, 105, 106 read these select signals to take into account values carried on system bus 120.

On-chip memories 103 store the control application software (i.e., program instructions) to be processed by microprocessor 101. The microcontroller 100 is powered by means of a different set of terminals 140. Terminals 140 comprise a series of physical access terminals (PADs) to power the microcontroller 100, some for providing VDD, some for providing GND. A user application runs software, which may be loaded within on-chip memories 103 during the startup of the microcontroller (boot section). The software located within on-chip memory 103 is fetched by microprocessor 101 by means of system bus 120. The on-chip memory 103 is selected (e.g., signal 123 is active) as soon as the address value of the address bus matches the address range allocated for the on-chip memory. The address decoder 102 is designed accordingly, the address range being hard-wired in the address decoder. As a response, the memory provides the corresponding data onto system bus 120 which is read by microprocessor 101 and processed accordingly.

The software may also be aware of the availability of a data through the interrupt signal 125. When set, this signal triggers an interrupt controller 104. Then the interrupt controller 104 signals the event directly to a dedicated pin of the microprocessor 101. A central interrupt module allows any number of interrupts to be handled by a single input pin on the microprocessor 101. When the microprocessor 101 is triggered by the interrupt signal, its internal state machine interrupts the processing of the current task and performs a read access on the interrupt controller 104 by means of system bus 120 to get the source (peripheral) of interrupt.

The microcontroller 100 supervises the control of an electrical motor 150. To get feedback information, a rotary sensor 160 is mounted on or in proximity to a shaft 161 of the motor. To create the rotation, the PWM module 105 generates a set of signals 132. The rotation is detected by rotary sensor 160, which creates electrical signals 133 and 134 according to the speed of the motor. The amplification of signals 132 in order to match the voltage requirements of the motor, and amplification of signals 133, 134 to adapt the microcontroller 100 voltage levels and the power supply circuitries of rotary sensor are well known and therefore not described in this document.

Several types of rotary sensors exist but they basically provide the same type of electrical signals. If only one signal is provided there may be no way to determine the rotation direction. Some sensors provide two electrical signals aligned in quadrature. This quadrature alignment, after processing (decoding), provides the direction of rotation. Of particular relevance to the exemplary embodiments described herein, the rotary sensor 160 may be a photo-detector acting in concert with a coding wheel. For example, the coding wheel may be attached to the shaft 161 and may be coaxial with the shaft in order to rotate at the shaft 161 rotates, and the photo-detector may be positioned to emit a photonic beam onto a face of the coding wheel, impinging lithography or other masking structures (e.g., a pattern of slots or holes) on the face that either absorbs/deflects the beam or reflects the beam back to the photo-detector. The photo-detector produces sensor signals indicating whether or not it received a reflected beam.

Figure 2A:
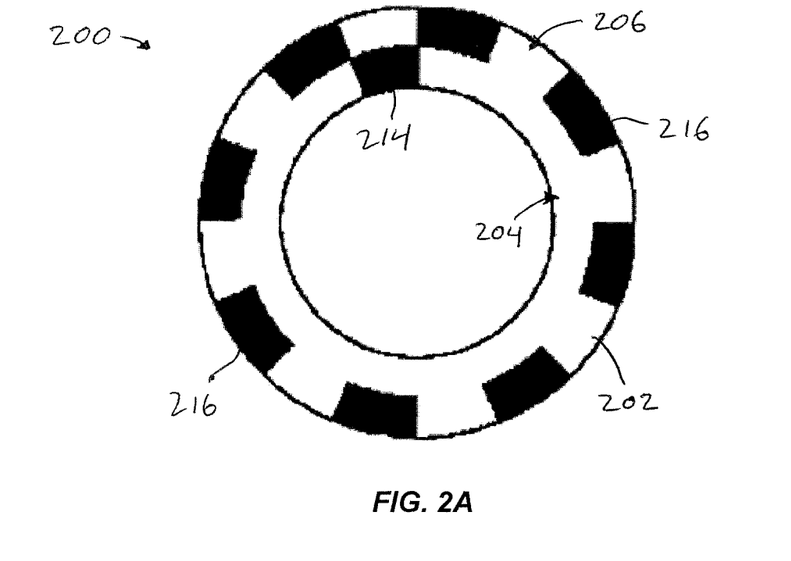
FIG. 2A is a front view of an exemplary non-quadrature coding wheel having an index track.
Figure 2B:
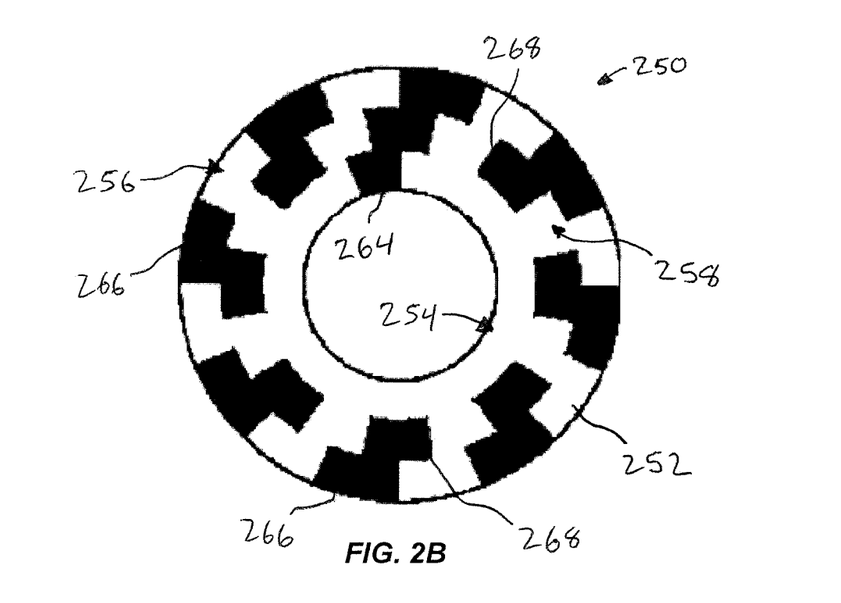
FIG. 2B is a front view of an exemplary two-track quadrature coding wheel having an index track.

FIGS. 2A and 2B illustrate two example coding wheels having step markers on the respective faces. The markers, which are black in the figures, absorb or deflect incident light from the photo-detector beam, and the part of the face around the markers reflect the light back to the photo-detector (or vice-versa). On the coding wheel 200 of FIG. 2A, the face 202 carries two tracks: an index track 204 abuts the inner edge of the coding wheel 200, and an angular step track 206 abuts the outer edge of the coding wheel 200. The index track 204 carries a single index marker 214; each time the sensor signal includes a detection of the index marker 214, it indicates that the motor completed one revolution. The angular step track 206 comprises a plurality of evenly sized and evenly spaced angular step markers 216. Each angular step marker 216 represents a change of the motor position by a selected degree increment. For example, if there are eight angular step markers 216 as illustrated, each detection by the photo-detector of one of the angular step markers 216 indicates that the motor has rotated another 45 degrees.

Referring to FIG. 2B, the coding wheel 250 has a face 252 that includes an index track 254 with an index marker 264 as described above, and further includes two angular step tracks 256, 258 in which the angular step markers 266 of a first angular step track 256 are aligned in quadrature with the angular step markers 268 of a second angular step track 258. When the angular step tracks 256, 258 are monitored using separate sensor signals, the quadrature alignment allows for detection of the direction of the motor's rotation using the leading edge of the angular step markers 266, 268. For example, when the leading edge of a first angular step marker 266 of the first, outer angular step track 256 is detected, the motor is rotating clockwise if the corresponding aligned second angular step marker 268 of the second, inner angular step track 258 is not detected, and is rotating counter-clockwise if the second angular step marker 268 is detected.

Figure 3A:
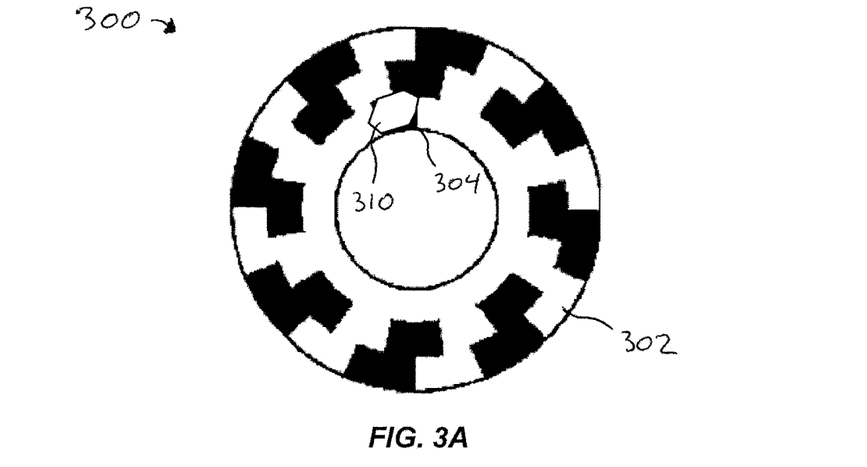
FIGS. 3A-C are front views of the coding wheel of FIG. 2B exhibiting different types of defects.
Figure 3B:
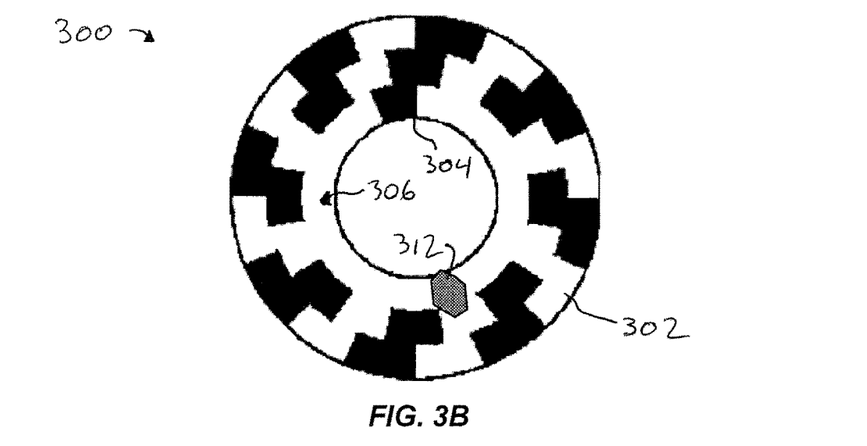
Figure 3C:
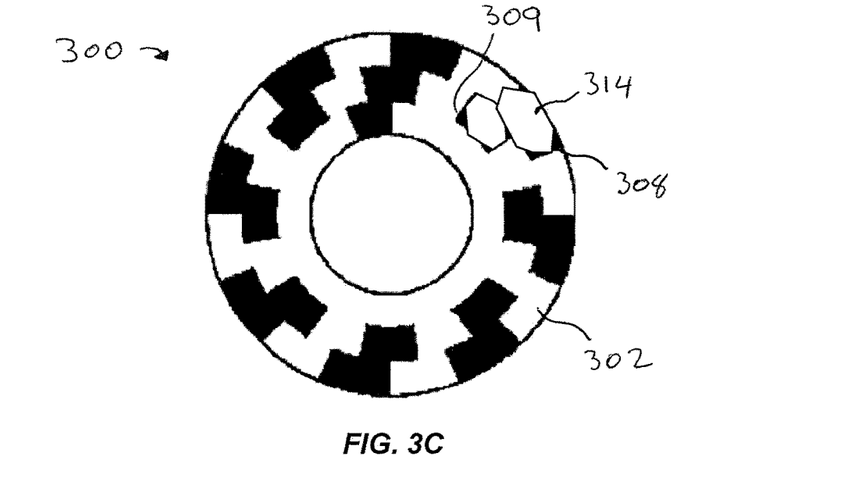

Referring to FIGS. 3A-C, contaminants and damage can affect whether the lithography (i.e., markers) on the face 302 of a coding wheel 300 is properly detected. There are three types of errors that contaminants and damage can create. FIG. 3A shows a first error type, in which the index marker 304 is obscured by a defect 310 and is not detected in the sensor signal. The QDEC module may lose count of the number of revolutions and misreport the position and/or number of revolutions of the motor. FIG. 3B shows a second error type, in which a defect 312 on the index track 306 mimics the index marker 304, causing the QDEC module to detect a false index and count a revolution of the motor before the motor has actually completed the revolution. FIG. 3C shows a third error type, in which one or more defects 314 obscure one or both of phase-aligned angular step markers 308, 309 such that the QDEC module does not record them, causing misreporting of the motor position and/or speed. While previous solutions could detect one error type (specifically, error type one: "missing index") and possibly could detect certain subsets of a second (specifically, error type three: "missing one phase"), the present system correctly detects all three types of errors in uni- and bidirectional motors.

Figure 4:
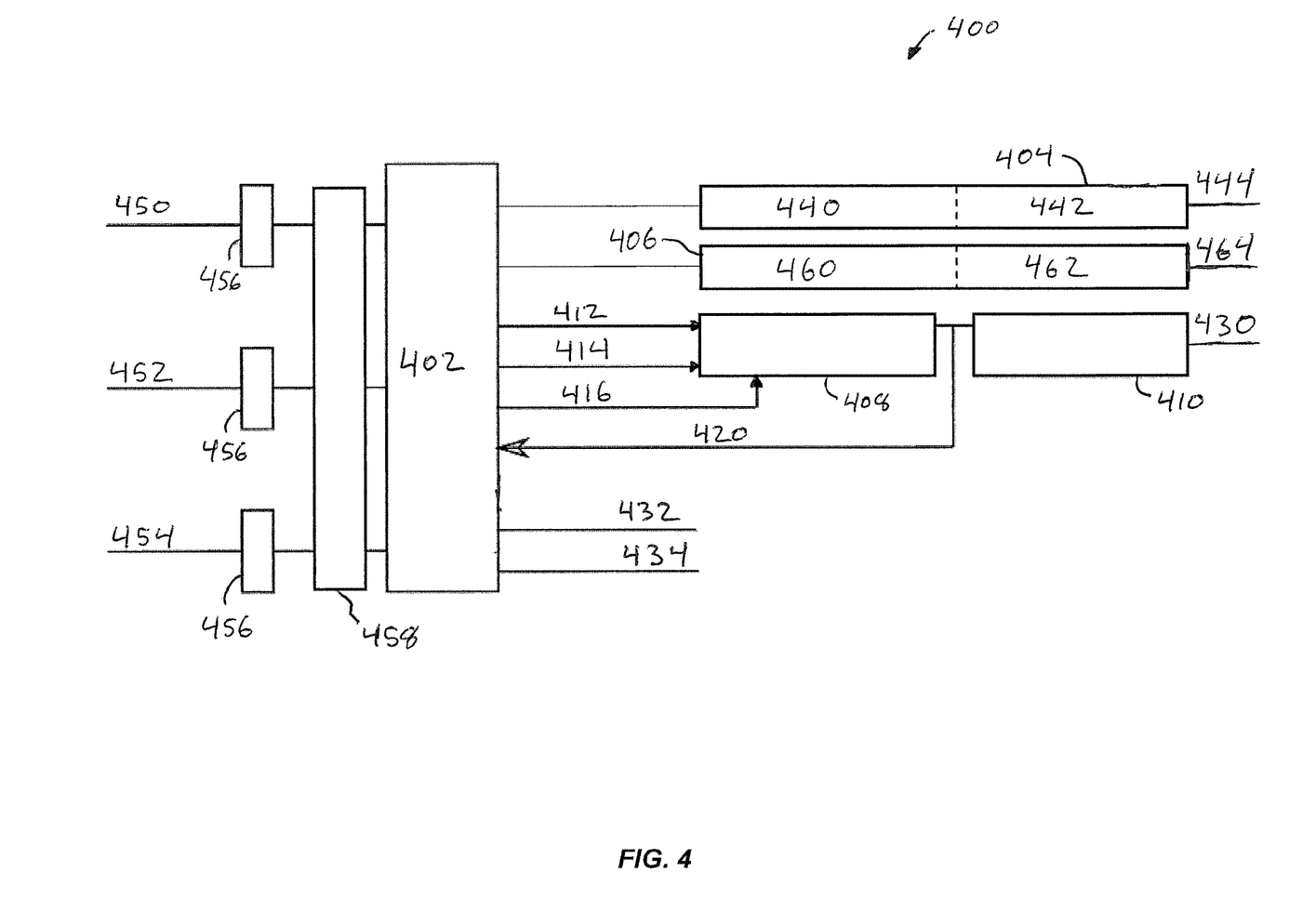
FIG. 4 is a logic diagram of a system for detecting defects in motor operation information obtained from a defective coding wheel, in accordance with the present disclosure.

FIG. 4 illustrates an exemplary logical implementation 400 of a QDEC module 402 that identifies errors (i.e., caused by coding wheel defects) of any of the three types in sensor signals as described above, by maintaining a count of angular step detections between index detections, comparing the count to one or more stored reference values and to the value of the index signal, and generating an error signal if certain expected values do not match the results of the comparisons. The QDEC module 402 can be connected downstream to any suitable QDEC filtering circuitry 458 and/or signal synchronizing circuitry 456 that receives raw or conditioned rotary sensor signals 450, 452, 454, or the QDEC module 402 can be coupled directly to rotary sensor outputs. The QDEC module 402 may receive a distinct sensor signal corresponding to each of the index track, the first angular step track, and the second angular step track. In various embodiments, a sensor output 133 (of FIG. 1) producing signal data for a first phase (Phase A) associated with sensing the angular step markers on the outer track of the coding wheel may be conditioned by signal conditioning circuitry (not shown) having combinational logic that produces a desired data format for a first sensor signal 450; in the same manner, sensor outputs 134, 135 (of FIG. 1) for a second phase (Phase B, associated with sensing angular step markers on an inner track of the coding wheel) and for the index signal (associated with sensing the index marker on the index track of the coding wheel) may be conditioned to generate desirably formatted second sensor signal 452 and third sensor signal 454, respectively. In some embodiments, each sensor signal can be interpreted as having a high value or a low value; where the face of the coding wheel is reflective and the markers are non-reflective, the sensor signal for each track is high when the beam of the rotary sensor is not incident on a corresponding marker, and switches to low when a marker on the corresponding track rotates into the path of the beam.

The QDEC module 402 may include or access one or more registers capable of storing reference values for comparison as described below. The registers may store a predetermined number of bits of data, such as 16 bits or 32 bits, as needed for the relevant comparison. In some embodiments, a first register 404 and a second register 406 may cooperate to store at least an angular count reference value, and further optionally a revolution count reference value. The bits of the registers 404, 406 may be divided such that a first part 440, 460 of each of the registers 404, 406 has the same length (i.e., number of bits) as the angular step count, and a second part 442, 462 of each of the registers 404, 406 has the same length as the revolution count. The first part 440, 460 may contain the most significant bits, and the second part 442, 462 may contain the least significant bits, of the corresponding register 404, 406. Thus, first reference values for each of the angular step count and the revolution count may be programmed into the first register 404, and second reference values for each of the angular step count and the revolution count, which may be the same or different as the corresponding first reference value, may be programmed into the second register 406. In an exemplary embodiment, the stored reference values may be the maximum, or overflow, values of the angular step count and the revolution count.

The QDEC module 402 further includes an angular counter 408 having combinational logic that maintains the angular step count (e.g., as a value stored in a register), and a revolution counter 410 having combinational logic that maintains the revolution count (e.g., as a value stored in a register). The QDEC module 402 produces a count update signal 412 from at least the Phase A signal 450 and optionally also the Phase B signal 452 and/or a system clock signal (not shown). The QDEC module 402 also produces a direction signal 414 representing the direction of rotation of the motor, and a reset signal 416 that indicates the value of the angular step count should be reset to a starting value (e.g., when the third sensor signal 454 indicates the index marker was detected). The signals 412-416 are delivered to the angular counter 408. The count update signal 412 and the reset signal 416 each cause the angular counter 408 to modify the value of the angular step count. The modification may depend on the value of the direction signal 414: if the motor is rotating in a first direction, the angular counter 408 may increment the angular step count in response to the count update signal 412, and may set the angular step count to zero in response to the reset signal 416; if the motor is rotating in a second direction, the angular counter 408 may decrement the angular step count in response to the count update signal 412, and may set the angular step count to the reference value stored in the register 404 (e.g., the maximum value) in response to the reset signal 416.

The angular counter 408 may further include combinational logic for comparing the angular step count value to one or both of the corresponding reference values stored in the registers 404, 406, and to perform actions in response to the results of the comparison(s). The comparisons and actions may be synchronized with other operations of the QDEC module 402, such as by using a rising clock signal to coordinate the operations. In one embodiment, the first parts 440, 460 of the registers 404, 406 may each store a preset maximum value that is the expected value the angular step count, counting up from zero, should have upon one complete revolution of the motor; thus, the reference values for the angular step count are associated with the number of angular step markers that pass through the sensing system in one revolution of the coding wheel. The angular counter 408 may determine from the direction signal 414 that the motor is rotating in the first direction, compare the angular step count value to the reference value in the first part 440 of the first register 404, and generate an overflow signal 420 if the values match. For example, signals encoding the angular step count value and the reference value may be inputs to one or more XNOR gates that compare the values in the corresponding registries, bit-by-bit, to determine equivalence, and the XNOR gate outputs may be fed into a global AND gate that generates the overflow signal 420; the overflow signal 420 is normally low and switches to high when the angular step count is equal to the preset maximum value. In the same manner, the angular counter 408 may determine from the direction signal 414 that the motor is rotating in the second direction, determine whether the angular step count value is zero, and generate the overflow signal 420 if so. The XNOR gates of the example above may be connected to other combinational logic that determines whether to input the stored reference value or a value of zero into the XNOR gate for comparison to the angular step count value. The overflow signal 420 may be sent to the QDEC module 402 and to the revolution counter 410 as illustrated.

Storing a preset overflow value as described above allows the system to be used with coding wheels that have a number of angular step markers that not a power of two. In embodiments where the coding wheel does have $2^x$ angular step markers, the angular step value may be stored with a length of x bits, so that the maximum value of the angular step counter that can be stored is equal to the number of angular step markers (or more specifically, to $(2^x)-1$, where the register storing the value counts up from zero). This creates a natural overflow condition in which the angular counter 408 may generate the overflow signal when the register reaches its maximum storable value (i.e., all bits are 1's).

The angular counter 408 may further reset the angular step count, as described above, in response to the determining that the angular step count is at overflow (i.e., the angular step count value is equal to the maximum value when incrementing or to zero when decrementing). In one embodiment, the angular counter 408 may include combinational logic for resetting the angular step count in response to the overflow condition. In another embodiment, the QDEC module 402 may respond to receiving the overflow signal 420 by sending the reset signal 416 to the angular counter 408. In a similar manner, determining that the angular step count value is equal to the reference value stored in the first register 404 or the second register 406 may cause a corresponding interrupt signal 444, 464 to be generated. The interrupt signals 444, 464 may be sent to another component of the motor control system to cause the motor control system to take action based on the motor condition indicated by the matching values.

The revolution counter 410 may include combinational logic for updating the revolution count in response to receiving the overflow signal 420; thus, the revolution count may be updated each time the system tracks a complete revolution of the coding wheel. The revolution count may be incremented when the motor is rotating in the first direction and decremented when the motor is rotating in the second direction. In one embodiment the revolution counter 410 receives the direction signal 414, while in another embodiment the revolution counter 410 uses an encoded value in the overflow signal, to determine the direction of rotation. In some embodiments, the revolution counter 410 may further receive an index detection signal (not shown) indicating that the index marker is detected, and may update the revolution count in response to the index detection signal.

The revolution counter 410 may further include combinational logic for comparing the revolution count value to one or both of the corresponding reference values stored in the registers 404, 406, and to perform actions in response to the results of the comparison(s). The comparisons and actions may be synchronized with other operations of the QDEC module 402, such as by using a rising clock signal or the overflow signal 420 to coordinate the operations. In one embodiment, the second parts 442, 462 of the registers 404, 406 may each store a preset maximum value for the revolution count; thus, the revolution count may, like the angular step count, be monitored for an overflow condition. The revolution counter 410 may reset the revolution count value by setting the value to zero (when the motor is rotating in the first direction) or to the preset maximum value (when the motor is rotating in the second direction) stored in one of the registers 404, 406. In some embodiments, another component of the motor control system may track the number of revolutions of the motor, or perform some other action, based on the number of times the QDEC module 402 detects a complete revolution; thus, each time the revolution count reaches its stored overflow value, the revolution counter 410 may generate an interrupt signal 430 that is delivered to the appropriate component.

In some embodiments, the revolution counter reference value stored in one of the registers 404, 406 may be used to coordinate error detection at startup of the motor. For example, at motor startup the revolution count may be set to zero if the motor is rotating in the first direction and to the maximum value (stored in the second part 442 of the first register 404) if the motor is rotating in the second direction. The revolution count value may also be stored in a reference register (not shown) of the revolution counter 410. When the revolution counter 410 receives the overflow signal 420 from the angular counter 408, the revolution counter 410 may update the revolution count value and then check the value in the reference register. If the value is still the originally stored value, meaning the present overflow condition is the first overflow detected after motor startup, the revolution counter 410 may store the updated revolution count value as the new value in the reference register. If the reference value is not the originally stored value, it means the angular step count has overflowed at least once and the index marker has not yet been detected; the revolution counter 410 may indicate, to the QDEC module 402 or to another component of the motor control system via the interrupt signal 464, that an error of type 3—missing index marker—is present. In some embodiments, if the reference value is neither zero nor MAX, the revolution counter 410 may compare the updated revolution count value to the reference value and indicate an error if the values are not the same (i.e., the motor has completed another revolution without detection of the index marker).

The QDEC module 402 may further include other combinational logic for detecting an error of any of the types described above. In some embodiments, the overflow signal 420 and the index signal 454 may be compared, such as in an XOR gate, to produce an error signal 432. The error signal 432 is low when the overflow signal 420 and the index signal 454 have the same value—this occurs when the angular step count is below the preset value and the index marker is not detected, and when the angular step count is equal to the preset value and the index marker is detected (i.e., the motor completed one revolution that was correctly detected). The error signal 432 switches to high when the overflow signal 420 and the index signal 454 have different values—this occurs when the angular step count reaches the maximum (or minimum) and the index marker is not detected (indicating an error type 1), and when the index marker is detected and the angular step count does not have the expected value (indicating an error type 2 or type 3). The QDEC module 402 may send the error signal 432, and may also send other signals 434, to other components of the motor control system.

Figure 5:
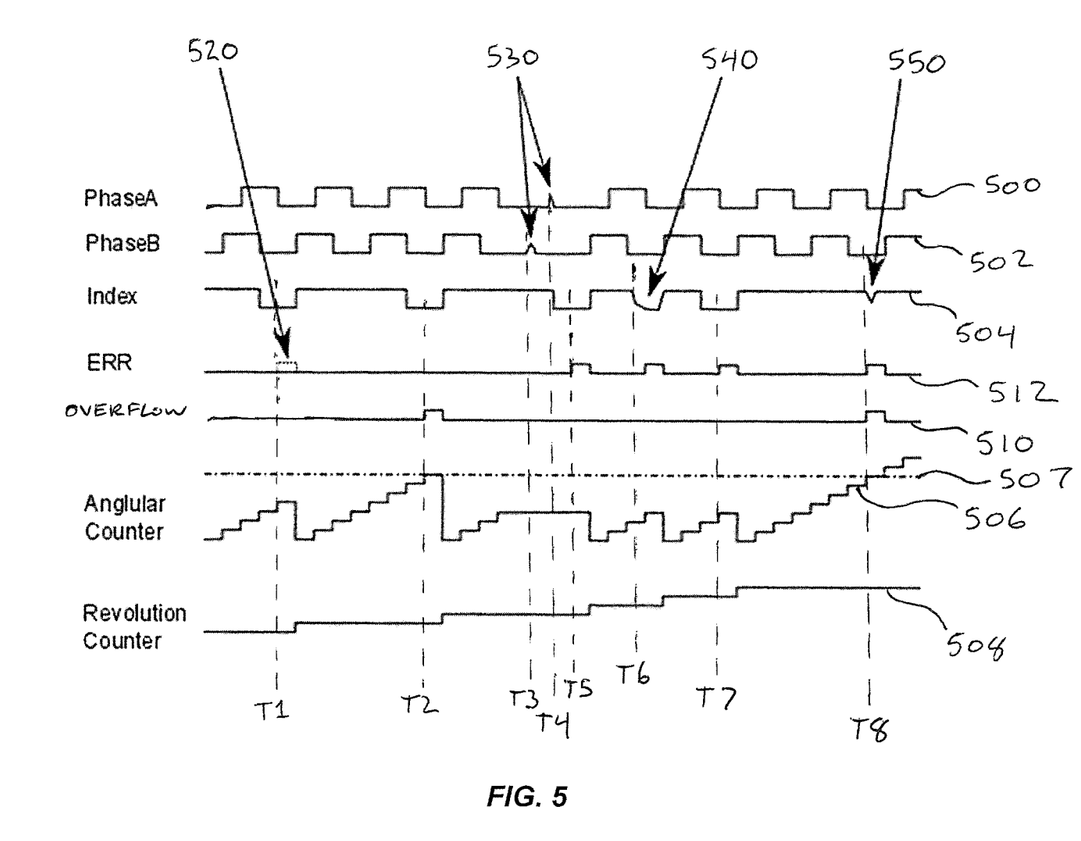
FIG. 5 is a diagram of inputs and internal waveforms for quadrature sensors and a quadrature decoder ("QDEC") configured to detect defects in a coding wheel in accordance with the present disclosure.

A QDEC module (such as the QDEC modules 106 of FIG. 1 and 402 of FIG. 4) may include electrically interconnected edge detection circuits, counter circuits, and error detection circuits that cooperate to process the sensor signals as described above, in some embodiments producing the exemplary timing diagram of FIG. 5. In this example, the first sensor waveform 500 corresponds to the waveform of signal 133 of FIG. 1 and is representative of the Phase A signal 450 of FIG. 4, the second sensor waveform 502 corresponds to the waveform of signal 134 of FIG. 1 and is representative the Phase B signal 452 of FIG. 4, and the third sensor waveform 504 corresponds to the waveform of signal 135 of FIG. 1 and is representative of the index signal 454 of FIG. 4. A waveform 506 representing the value of the angular counter is incremented each time the value of one of the phase waveforms 500, 502 changes. It is noted that in FIG. 5 and subsequent Figures, the waveforms 500, 502, 504, 506 are simplified to better illustrate the changing values; in practice, one of the values of the phase waveforms 500, 502, and thus the value of the angular counter, changes many more times, potentially hundreds of times, per revolution. It is also contemplated that the raw sensor signals (e.g., signals 133-135 of FIG. 1) may be processed, such as through an edge reduction circuit, to produce phase signals and corresponding waveforms 500, 502 that represent the detection of the markers on the coding wheel using a fewer number of value changes. When the value of the angular counter reaches the preset maximum value 507 (e.g., at time T2), the overflow signal represented by waveform 510 switches from low to high. A waveform 508 representing the value of a revolution counter may be incremented each time the index marker is detected (i.e., the waveform 504 switches from low to high on the trailing edge of the index marker).

A waveform 512 may represent the error signal described above. Since it is produced by the XOR of waveform 504 (the index signal) (or an inversion thereof, as shown) with waveform 510 (the overflow signal), waveform 512 switches from low to high when one but not both of the inverted waveform 504 and the waveform 510 is high. The presence of a defect producing any of the three error types may be reflected in the waveform's 512 switch to high. Several non-limiting examples of detecting the different error types are illustrated in the timing diagram of FIG. 5. At time T1, an error 520 discussed further below is generated when the index marker is detected before the angular counter reaches the maximum value. At times T3 and T4, obscured angular step markers in both angular step tracks cause an error 530 of type 3, wherein no angular steps are detected; the angular step count is therefore not incremented, and at the next index marker detection (time T5) the waveform 512 switches to high because the waveform 510 remains low. At time T6, a false index marker is detected, producing an error 540 of type 2, wherein the waveform 512 is pulled high by the premature index detection because the angular step count is not full. The error 540 also causes an error at time T7 because the angular step count is reset by the false index marker detection, so the next accurate index marker detection arrives before the angular step count value reaches the maximum. Finally, at time T8, an obscured index marker is not detected, producing an error 550 of type 1, wherein the angular counter reaches the maximum value, pulling the waveform 510 high which in turn pulls the waveform 512 high; the angular step count may, in some embodiments, be allowed to continue increasing since no index marker was detected to reset it.

The error 520 at time T1 may be the first detected error after motor startup. However, it may not be possible for the QDEC module to know the position of the motor at startup, and the motor may be partially through a revolution. This initial position would cause the rotary sensor to first detect the index marker before the angular step count is full, producing a type 3 error. In some embodiments, if the error 520 is a type 3 error, the error 520 may be ignored; further, the first detection of the index marker (i.e., at time T1) may be used to synchronize the angular step counter with the index marker position, by resetting the angular step counter on first detection of the index marker (i.e., at time T1). All subsequently detected errors may be processed normally.

When waveform 512 is high, the QDEC module may send an alert to the microprocessor and/or to a user device; the microprocessor, receiving the alert, may take corrective action such as generating and delivering a user alert and/or creating an entry in a performance log indicating that an error was detected and maintenance of the coding wheel may be needed.

Figure 6:
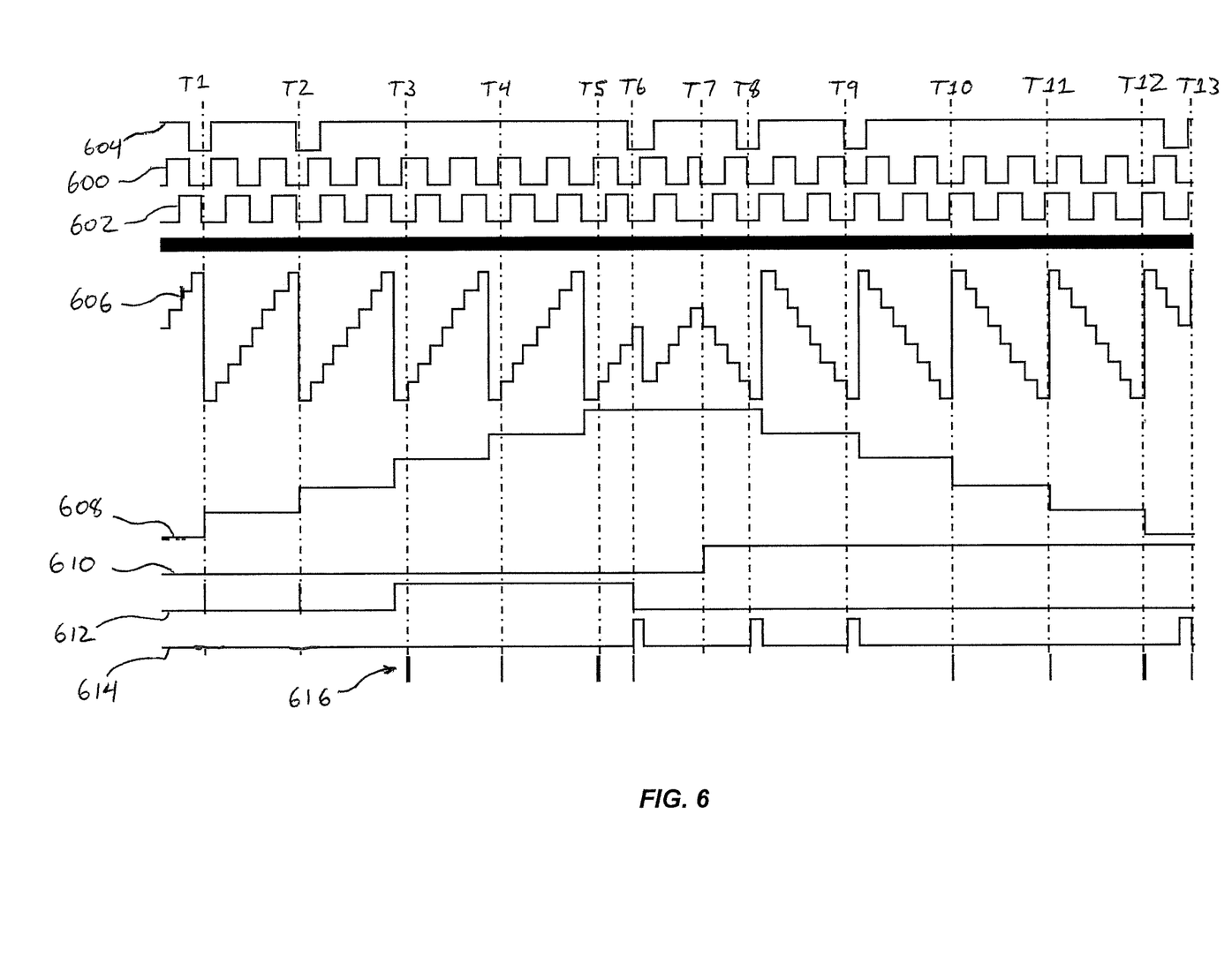
FIG. 6 is a diagram of output waveforms for quadrature sensors and a quadrature decoder ("QDEC") configured to detect defects in a coding wheel for a bi-directional motor, in accordance with the present disclosure.

The present detection methods may be used in bi-directional motors wherein the methods must account for changes of the motor's direction of rotation, as well as for errors, such as lithographic imprecision on the coding wheel and electrical transmission delays, that cause more than one sensor signal to appear to transition on the same clock cycle. Using the signals generated as described above, a system may implement a two-state machine including an "expected index" state that reacts to the sensor signals when the motor is rotating in a first direction, and a "pending index" state that reacts to the sensor signals when the motor is rotating in a second, opposite direction. FIG. 6 illustrates a series of waveforms demonstrating this error detection scheme as the motor is operated over time. Waveform 600 represents the Phase A signal and waveform 602 represents the Phase B signal generated by detecting the angular step markers as described above. Similarly, waveform 604 represents the index signal, waveform 606 represents the angular step count, and waveform 608 represents a revolution counter. As shown, the angular step count may be incremented up to a maximum value when the motor is rotating in the first direction, and may be decremented down to a minimum value (e.g., zero) when the motor is rotating in the second direction. Resetting the angular step count means setting the count to zero when the motor is rotating in the first direction, and to the maximum value when the motor is rotating in the second direction.

In the "expected index" state, the angular step counter counts up toward the maximum value. If no index marker is detected when the angular step count reaches the maximum value, the "expected index" waveform 612 switches to (or remains) high. The angular step count is reset and, at the next change of one of the phase signals, if the index marker is detected and "expected index" is high, the system is working properly and "expected index" is reset; otherwise, a type 1 "missing index" error signal is generated. "Expected index" may remain high until the index marker is detected. Meanwhile, each time the angular step count reaches the maximum or minimum value and is reset, another type 1 error is generated.

In the "pending index" state, the angular step counter counts down toward a minimum value, typically zero. When the index marker is detected, the "pending index" waveform 614 switches to high; the waveform 614 switches back to low when the next edge of one of the waveforms 600, 602 is detected If the angular step count is reset when "pending index" is high, the detection system is working properly. If the angular step count reaches its minimum value and resets when "pending state" is low, a type 2 or type 3 error is present and an error signal is generated.

The direction of rotation may be tracked by a direction flag, represented by waveform 610 and having a low value when the motor is rotating in the first direction and a high value when the motor is rotating in the second direction. The direction of rotation may be presumed at motor startup, or may be determined by identifying which phase signal's leading/trailing edge is detected first—for example, if the Phase A signal changes to high (or to low, if one of the signals starts high) before the Phase B signal, the motor is rotating in the first direction. A change of direction may be identified when the QDEC module detects two consecutive changes in the value of one of the phase signals, without detecting a change in the value of the other. For example, at time T7, the QDEC module detects the Phase A signal (waveform 600) switch to low after switching to high while the Phase B signal (waveform 602) remained low. The direction flag may be switched to high to indicate a change to the second direction. When the direction flag is high, the angular step count is decremented until it reaches the minimum value, at which time (e.g., times T8-T12 of FIG. 6) an index marker is expected. If the index marker is received (e.g., at times T8 and T9), the detection system is working properly, but if not (e.g., at times T10-T12) the QDEC module generates an error. The angular step count is then reset to the maximum value.

When the motor is rotating in the first direction (i.e., waveform 610 is low), waveform 612 tracks when the system enters the "expected index" state, at which point the tracked signal switches to high. When the index marker is detected and the system exits the "expected index" state (e.g., at time T6), the signal tracked by waveform 612 switches to low. Each time the angular step count leaves its reset value while the system is in the "expected index" state (e.g., at times T3, T4, and T5), the QDEC module may generate an error 616. When the motor is rotating in the second direction (i.e., waveform 610 is high), waveform 614 tracks when the system enters and exits the "pending index" state. The tracked signal switches to high each time the index marker is detected (e.g., times T8, T9, and T13), and switches back to low when the angular step count resets. If the angular step count is reset when "pending index" is low, then the index marker and angular step count are out of alignment and the QDEC module generates an error 616 at reset of angular step count to low (e.g., at time T13).

Figure 7:
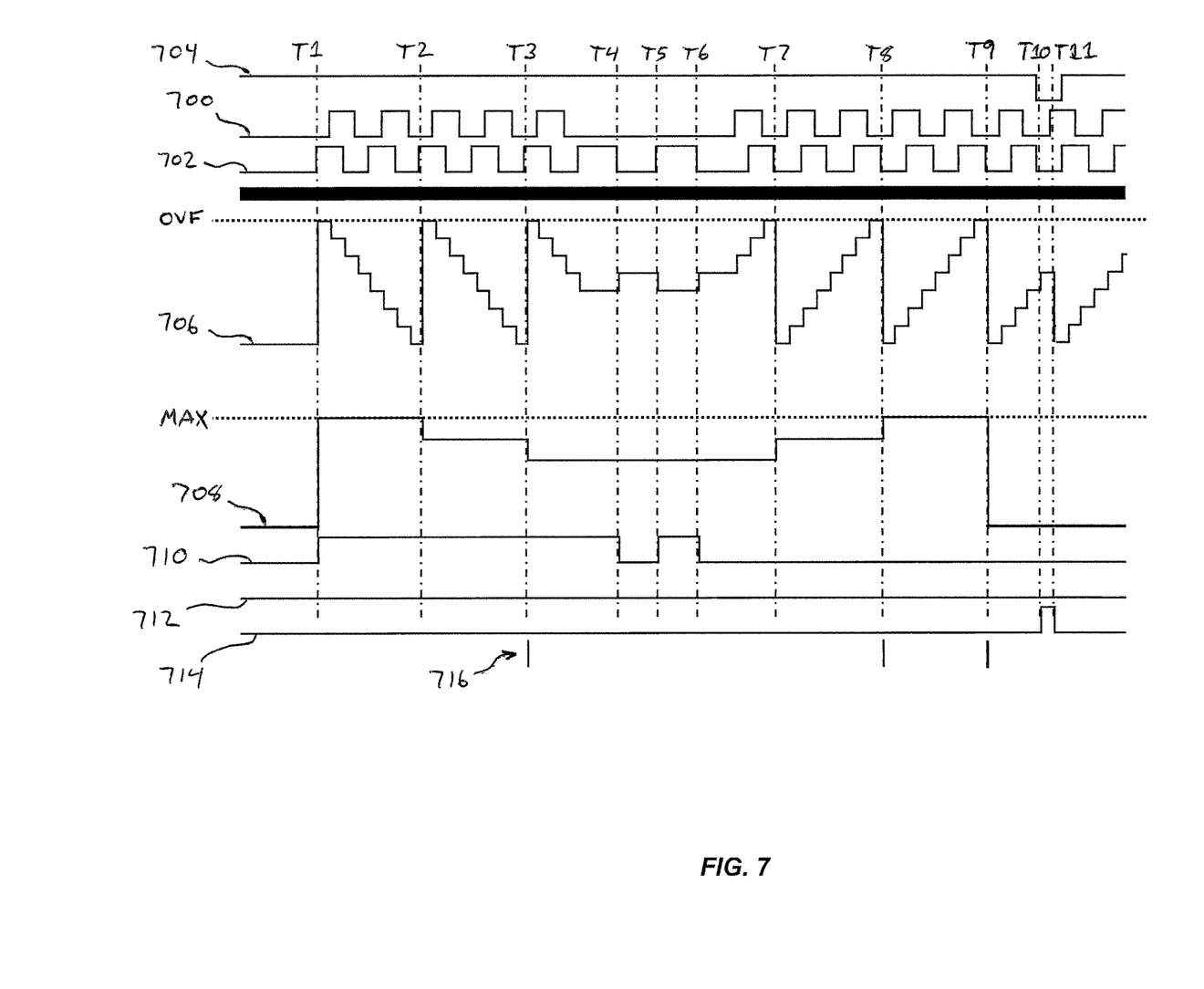
FIG. 7 is a diagram of output waveforms for quadrature sensors and a quadrature decoder ("QDEC") configured to detect defects in a coding wheel during an initialization process of the QDEC in accordance with the present disclosure.

At motor startup, the QDEC module may be unaware of the motor's starting position and direction of rotation and may begin in an "initialization mode" wherein the angular step count cannot be associated (i.e., synchronized) with the location of the index marker until the index marker is first detected. Referring to FIG. 7, an initialization process may be used to check for errors of type 3—missing index marker—until the QDEC module is able to synchronize the angular step count with the index position. The system described by the timing diagram of FIG. 7 operates in the same manner as the system described by the timing diagram of FIG. 6. Thus, waveform 700 represents the Phase A signal, waveform 702 represents the Phase B signal, waveform 704 represents the index signal, waveform 706 represents the angular step count (having an overflow value OVF), waveform 708 represents the revolution counter (having a maximum value MAX), waveform 710 represents the direction signal, waveform 712 represents the "expected" index signal, waveform 714 represents the "pending" index signal, and has marks 716 indicate errors generated. The angular step count and revolution count may be incremented up to the respective maximum values when the motor is rotating in the first direction, and may be decremented down to a minimum value (e.g., zero) when the motor is rotating in the second direction. Resetting the angular step count and the revolution count means setting the count to zero when the motor is rotating in the first direction, and to the respective maximum value when the motor is rotating in the second direction.

In the example, the motor is started at time T1 and is initially rotating in the second direction; consequently, the angular step count and revolution count are initialized with their respective maximum values and are decremented at the relevant signal changes, and the "expected" index state is not used (though the index marker position is not known before its first detection in T10. At time T2, the first angular step overflow condition occurs, although the index marker has not yet been detected. From an error detection standpoint, this first overflow is ignored: the angular step count is reset, the revolution count is decremented, and the new revolution count value "MAX-1" is stored as a reference value as described above, but no error is generated. Then, a second overflow occurs at time T3 with still no index marker detection, and the system generates an error 716 when it determines, after decrementing the revolution count, that the new revolution count is not equal to the previously stored reference value, indicating that the coding wheel made a complete revolution without presenting any index.

Signal changes at times T4, T5, and T6 show that the counters are maintained even through rapid changes in motor direction. From time T6 the motor is rotating in the first direction, so the respective counts are to be incremented and the system is in the "pending" index state. At time T7, another overflow is reached and the index marker still has not been detected. However, the motor is now rotating opposite its direction at startup, and after the revolution count is incremented, its new value is equal to the previously stored reference value (i.e., the value after the first complete rotation), so an error 716 is not generated. Errors 716 are generated at the overflows reached at times T8 and T9, with the revolution counter reaching its maximum value MAX at time T8 and then resetting to zero at time T9. The index marker is finally detected at the edge of waveform 702 at time T10, and at the next detected edge (of waveform 700 at time T11) the angular step count is reset and finally synchronized with the index marker location. The error detection may then proceed as normal.

The systems, devices, and methods of the present disclosure improve the security and reliability of speed and position measurements for a rotating device based on one or more input from rotation sensors. In particular, the present disclosure provides control processes that detect errors in sensor information pertaining to angular steps and revolutions of the device during operation as described. The exemplary methods provide detailed description of the error detection for a motor, and particularly for a motor equipped with a coding wheel having at least one index track and at least one angular step track, and in some embodiments having two angular step tracks aligned in quadrature. However, the methods and devices may also be employed for error detection of sensor information for a rotating knob or button (e.g., a potentiometer for volume control of a radio), and for any other rotary device monitored by sensors that generate angular and/or revolution information.

What is claimed is:

1. A method of detecting errors in a motor position sensing system, the method comprising:
   controlling an electric motor driving a rotary sensor by a microcontroller comprising a central processing unit (CPU), wherein the rotary sensor comprises a coding wheel, wherein the coding wheel comprises a plurality of tracks, wherein at least a first track comprises a plurality of even spaced optical markers and an index track comprises a single marker;
   wherein the microcontroller comprises a decoding module configured to receive signals from the rotary sensor and wherein the decoding module is coupled with control registers accessible by the CPU;
   detecting by the decoding module a first signal from the rotary sensor generated by a first photo sensor through the even spaced optical markers on the first track and generating a first angular step signal;
   detecting by the decoding module a second signal from the rotary sensor generated by a second photo sensor through the single marker on the index track and generating an index signal;
   detecting by the decoding module edges of at least the first angular step signal and the index signal, the first angular step signal indicative of an angular position of a motor shaft, the index signal comprising a pulse indicative of a complete revolution around the motor shaft of the single marker of the second track, and the index signal having a first value if the single marker is detected and a second value if the single marker is not detected; and
   generating by the decoding module a step count representing a number, between an initial value and an overflow value, of detected edges of at least the first angular step signal and storing said step count by the decoding module in a first register of said control registers;
   producing by the decoding module an overflow signal if the step count is equal to the overflow value, wherein the overflow value has been set by the CPU and stored in a second register of said control registers;
   determining by the decoding module that the overflow signal and the index signal do not match; and
   in response to the determining, generating by the decoding module an error signal indicating that an error has been detected.

2. The method of claim 1, further comprising detecting edges of a second angular step signal by the decoding module indicative of the angular position, the first angular step signal and the second angular step signal being aligned in quadrature and being further indicative of a direction of rotation of the motor shaft.

3. The method of claim 1, wherein when the motor shaft is rotating in a first direction, the initial value is zero and the overflow value is a preset maximum value associated with a number of angular step markers on the coding wheel, and when the motor shaft is rotating in a second direction opposite the first direction, the initial value is the preset maximum value and the overflow value is zero, and wherein receiving the step count comprises:
   if a previous step count of previously detected edges is equal to the overflow value, setting the step count equal to the initial value;
   if the previous step count is not equal to the overflow value:

incrementing the previous step count to produce the step count if the motor shaft is rotating in the first direction; and decrementing the previous step count to produce the step count if the motor shaft is rotating in the second direction.

4. The method of claim 1, wherein generating the error signal by the decoding module comprises:

determining that the overflow signal has been generated while an index signal is missing and generating the error signal as a first error signal.

5. The method of claim 4, wherein the edges are detected for a runtime of the motor, the runtime beginning at the motor startup and including the detection of the one of the edges, the method further comprising, responsive to generating the error signal as a second error signal:

determining whether the second error signal was previously generated during the runtime;

responsive to a determination that the second error signal was not previously generated during the runtime, ignoring the generated second error signal; and responsive to a determination that the second error signal was previously generated during the runtime, sending the generated second error signal to a microprocessor configured to control the motor.

6. The method of claim 4, wherein generating the error signal by the decoding module comprises:

determining that the index signal has the first value while the step count is below the overflow value and generating the error signal as a second error signal.

7. The method of claim 1, wherein generating the error signal by the decoding module comprises:

determining that the index signal has the first value while the step count is below the overflow value and generating the error signal as a second error signal.

8. The method of claim 1, wherein generating the error signal by the decoding module comprises:

determining that one or both of the overflow signal and the index signal has been generated, generating a reset signal that resets the step count to the initial value upon a successive detection of one of the edges of the first angular step signal.

9. The method of claim 1, wherein the second registers store the overflow value in a first section of the second register and a revolution count reference value in a second section of the second register.

10. The method of claim 9, further comprising revolution counter, wherein the decoding module is further configured to compare the revolution count reference value in the second section of the second register with the value of the revolution counter.

11. A system for detecting errors in sensor signals recorded from a rotating device, the system comprising:

an electric motor driving a rotary sensor controlled by a microcontroller comprising a central processing unit (CPU), wherein the rotary sensor comprises a coding wheel, wherein the coding wheel comprises a plurality of tracks, wherein at least a first track comprises a plurality of even spaced optical markers and an index track comprises a single marker;

wherein the microcontroller comprises a decoding module configured to receive signals from the rotary sensor and wherein the decoding module comprises control registers accessible by the CPU;

a first photodetector configured to detect the even spaced optical markers on the first track and to generate a first angular step signal;

a second photodetector configured to detect the single marker on the index track and to generate an index signal;

wherein the decoding module further comprises:

an edge detection circuit operable to detect edges of at least the first angular step signal and the index signal, the first angular step signal indicative of an angular position of the device, the index signal comprising a pulse indicative of a complete revolution of an index around the device, and the index signal having a first value if the single marker is detected and a second value if the single marker is not detected;

a counter circuit coupled to the edge detection circuit, the counter circuit operable for maintaining a step count representing a number of detections of one of the edges of at least the first angular step signal, wherein the decoding module is configured to store the step count in a first register; and an error detection circuit coupled to the edge detection circuit and to the counter circuit, the error detection circuit operable to:

receive the step count;

produce an overflow signal when the step count is equal to a preset overflow value, wherein the overflow value is programmable by the CPU in a second register of the control registers;

determine whether the overflow signal and the index signal match; and responsive to a determination that the overflow signal and the index signal do not match, generate a first error signal indicating that an error is detected.

12. The system of claim 11, wherein the counter circuit is further operable for maintaining a revolution count in a third register of said control registers representing a number of revolutions of the device.

13. The system of claim 12, wherein:

at a startup of the device, when the device begins rotating from a stopped position, the counter circuit is configured to set the step count to a first initial value, to set the revolution count to a second initial value, and to store a third initial value in the second register as the reference value;

responsive to the edge detection circuit detecting the first of the edges of the index signal occurring after the startup, wherein the first register has a value different from the reference value in the second register and an error signal is generated, the counter circuit is configured to store the first initial value in the second register as the reference value and to ignore the error signal.

14. The system of claim 12, wherein at a startup of the device, when the device begins rotating from a stopped position, the counter circuit is configured to set the step count to a first initial value, to set the revolution count to a second initial value, and to store a third initial value in the second register as the reference value;

responsive to the edge detection circuit detecting the first of the edges of the at least the first angular step signal occurring after the startup and the error detection circuit produces a first overflow signal when the step count is equal to a preset overflow value without a matching index signal thereby generating an error signal, the counter circuit is configured to store the first initial value in the second register as the reference value to update the revolution count and store the updated revolution count as a revolution count reference and to ignore the error signal.

15. The system of claim 14, wherein responsive to the edge detection circuit detecting edges of the first angular step signal the counter circuit after the first overflow signal is configured to:
update the step count to a new step count value;
determine whether the new step count value is equal to the overflow value without a matching index signal, and if so, the counter circuit is further configured to:
update the revolution count to a new revolution count value;
determine whether the new revolution count value is equal to the revolution count reference, and if not so, the counter circuit is further configured to generate a second error signal.

16. The system of claim 11, wherein the error detection circuit is further operable to:
determine whether the first error signal is associated with a first of the errors to be detected subsequent to a startup of the device, when the device begins rotating from a stopped position;
responsive to a determination that the first error signal is associated with the first error, ignore the first error signal; and
responsive to a determination that the first error signal is not associated with the first error, send an alert to a component of a device control system.

17. The system of claim 11, wherein the device is a motor.

18. The system of claim 17, wherein a coding wheel comprising the index is disposed coaxially with a motor shaft of the motor, the coding wheel comprises a plurality of uniformly spaced angular step markers, and the sensor signals are generated by monitoring the coding wheel, the overflow value being based on the plurality of angular step markers.

19. The system of claim 11, wherein the device is a rotating knob.

20. The system of claim 11, wherein:
the edge detection circuit is further operable to detect edges of a second angular step signal that, together with the first angular step signal, is indicative of a direction of rotation of the device;
when the device is rotating in a first direction, the overflow value is a maximum value stored in the second register;
when the device is rotating in a second direction opposite the first direction, the overflow value is zero; and
to maintain the step count, the counter circuit is operable to determine a reset condition and to:
determine whether the device is rotating in the first direction or the second direction;
responsive to a determination that the device is rotating in the first direction, increment the step count in response to a detection of one of the edges of the first or second angular step signals, and set the step count to zero in response to the reset condition; and
responsive to a determination that the device is rotating in the second direction, decrement the step count in response to a detection of one of the edges of the first or second angular step signals, and set the step count to the maximum value in response to the reset condition.

21. The system of claim 20, wherein the first and second angular step signals being aligned in quadrature and being further indicative of a direction of rotation.

22. A system for detecting errors in sensor signals used for motor control, the system comprising:
an electric motor driving a rotary sensor controlled by a microcontroller comprising a central processing unit (CPU), wherein the rotary sensor comprises a coding wheel, wherein the coding wheel comprises three tracks, wherein at a first track and a second track each comprises a plurality of even spaced optical markers and an index track comprises a single marker;
wherein the microcontroller comprises a decoding module configured to receive signals from the rotary sensor and wherein the decoding module is coupled with control registers accessible by the CPU;
first and second photodetector configured to detect the even spaced optical markers on the first and second track and to generate a first and second quadrature signal, respectively;
a third photodetector configured to detect the single marker on the index track and to generate an index signal;
wherein the decoding module comprises:
a plurality of control registers accessible to the CPU comprising a first register storing a count step and a second register storing a preset overflow value set by the CPU;
an edge detection circuit operable to detect edges of the first quadrature signal, the second quadrature signal, and the index signal, the first and second quadrature signals comprising pulses indicative of an angular position and a direction of rotation of the motor shaft, and the index signal comprising an index pulse indicative of the single marker of the index track being detected;
a counter circuit coupled to the edge detection circuit, the counter circuit operable to generate a step count in response to a detection of the edges of the first and second quadrature signals, by modifying the step count one step toward an overflow value if the step count is not equal to the overflow value, or by resetting the step count to an initial value if the step count is equal to the overflow value, wherein when the motor shaft is rotating in a first direction the initial value is set to zero and the overflow value is set to the preset overflow value, and when the motor shaft is rotating in a second direction opposite the first direction the initial value is set to the preset overflow value and the overflow value is set to zero; and
an error detection circuit coupled to the edge detection circuit and to the counter circuit, the error detection circuit operable to:
determine whether the index signal indicates an index is detected and the step count is not equal to the overflow value and in response the error detection circuit is configured to generate a first error signal;
and
determine whether the step count is equal to the overflow value and that the index signal is missing and in response the error detection circuit is configured to generate a second error signal.

* * * * *